S. BENNETT.
APPARATUS FOR THE MANUFACTURE OF ICE.
No. 108,868. Patented Nov. 1, 1870
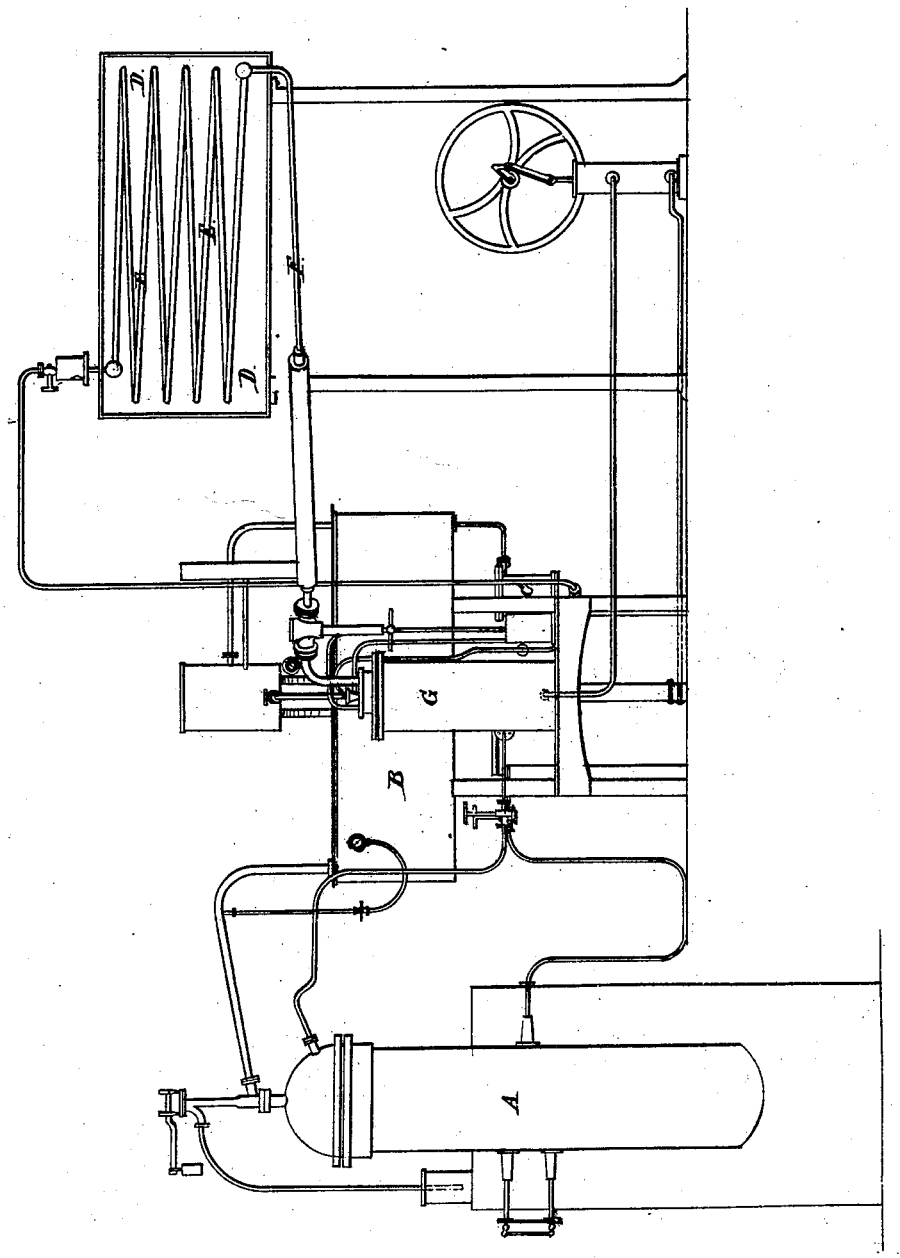

United States Patent Office.

SILVESTER BENNETT, OF JEFFERSON PARISH, LOUISIANA, ASSIGNOR TO MATTHEW JULIUS BUJAC, OF NEW YORK CITY.

Letters Patent No. 108,868, dated November 1, 1870.

IMPROVEMENT IN APPARATUS FOR THE MANUFACTURE OF ICE.

The Schedule referred to in these Letters Patent and making part of the same.

*To all whom it may concern:*

Be it known that I, SILVESTER BENNETT, of the parish of Jefferson, in the State of Louisiana, have invented a new and useful Improvement in Refrigerating Apparatus; and I do hereby declare the following to be a full, clear, and exact description thereof, which will enable others skilled in the art to which it appertains to make and use my invention, reference being had to the accompanying drawing which forms a part of this specification, and which is a longitudinal elevation of a refrigerating apparatus provided with my improvement, showing that part to which my improvement is applied in section.

The apparatus represented in the drawing is that commonly known as the Carré Ice-Machine, upon which patents were obtained F. P. E. Carré, October 2, 1860, and by Mignon & Rouart, September 26, 1865.

A represents the boiler, containing aqua ammonia, from which the ammoniacal gas is separated by the application of heat.

B, the liquefier, in which the ammoniacal gas so driven off is liquefied.

C, the recipient of the liquefied gas, from which it passes through a tube to the freezing-cistern D, within which this liquefied ammonia, being forced by the pressure from the boiler through the coiled pipe E, and expanding into gas, absorbs heat from the salt-water bath which surrounds the pipe E, thereby freezing the water which is contained in cans within the salt-water bath.

F is the pipe by which the ammonia escapes from the freezing-cistern to be again mixed with water in the absorption vessel G, and returned to the boiler as aqua ammonia.

In the operation of the machine as heretofore constructed more or less steam is formed in the boiler from the aqua ammonia, and is driven with the ammoniacal gas, through the intermediate pipes, into the liquefier and freezing-cistern. Consequently the liquefier, instead of containing only liquid ammonia, contains, also, more or less aqua ammonia, and when this mixture of liquid ammonia and aqua ammonia is forced through the pipe into the freezing-cistern, the aqua ammonia, separating from the ammonia which expands into pure ammoniacal gas, collects in the pipes at the bottom of the cistern. This aqua ammonia so collected in the cistern is not attracted to the water or "poor liquor" in the absorption vessel, but remains in the pipes, thereby absorbing the liquefied ammonia and preventing its expansion.

This defect in the operation of the machine causes the ice to thaw, and renders it necessary to empty the absorption vessel and force the aqua ammonia out of the freezing-cistern by increasing the boiler pressure, thereby frequently straining the machine.

The improvement by which I have endeavored to obviate this defect consists in elevating the freezing-cistern above the level of the absorption vessel, as shown in the drawing. By this means the liquid is descending from its entrance into the tubes of the freezing-cistern until it reaches the absorption vessel, and the aqua ammonia is separated by its own gravity from the pure ammoniacal gas, and flows down out of the cistern, leaving the ammoniacal gas free to expand.

What I claim as my invention, and desire to secure by Letters Patent of the United States, is—

The arrangement of the freezing-cistern above the absorption vessel, operating as and for the purpose described.

SILVESTER BENNETT.

Witnesses:
OCTAVE MOREL,
HENRY BUJAC.